March 2, 1937.  L. W. WRIGHT  2,072,540
MILLING MACHINE TRANSMISSION AND CONTROL MECHANISM
Filed Jan. 2, 1935  5 Sheets-Sheet 1

Inventor
LEIGH W. WRIGHT

By A H Parsons
Attorney

March 2, 1937.  L. W. WRIGHT  2,072,540

MILLING MACHINE TRANSMISSION AND CONTROL MECHANISM

Filed Jan. 2, 1935  5 Sheets-Sheet 2

Inventor
LEIGH W. WRIGHT
By A. K. Parsons
Attorney

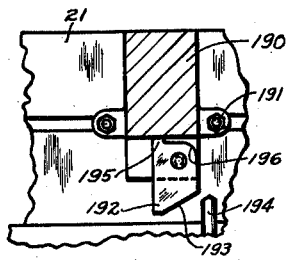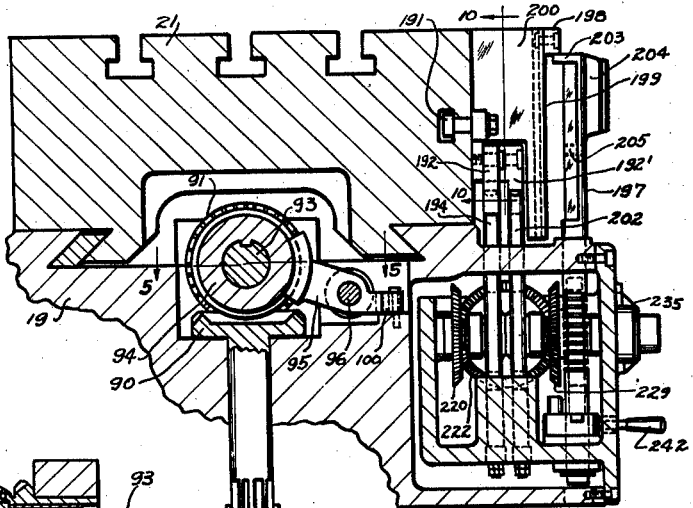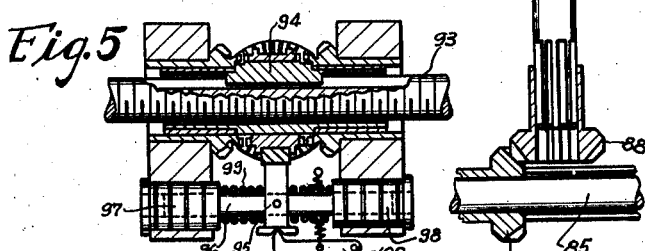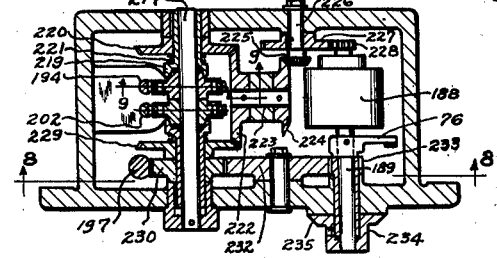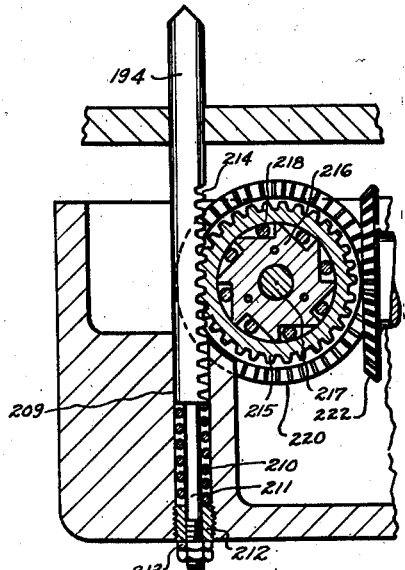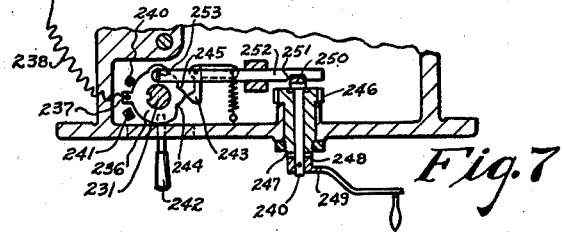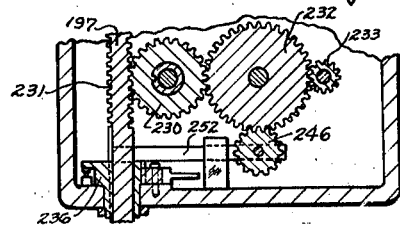

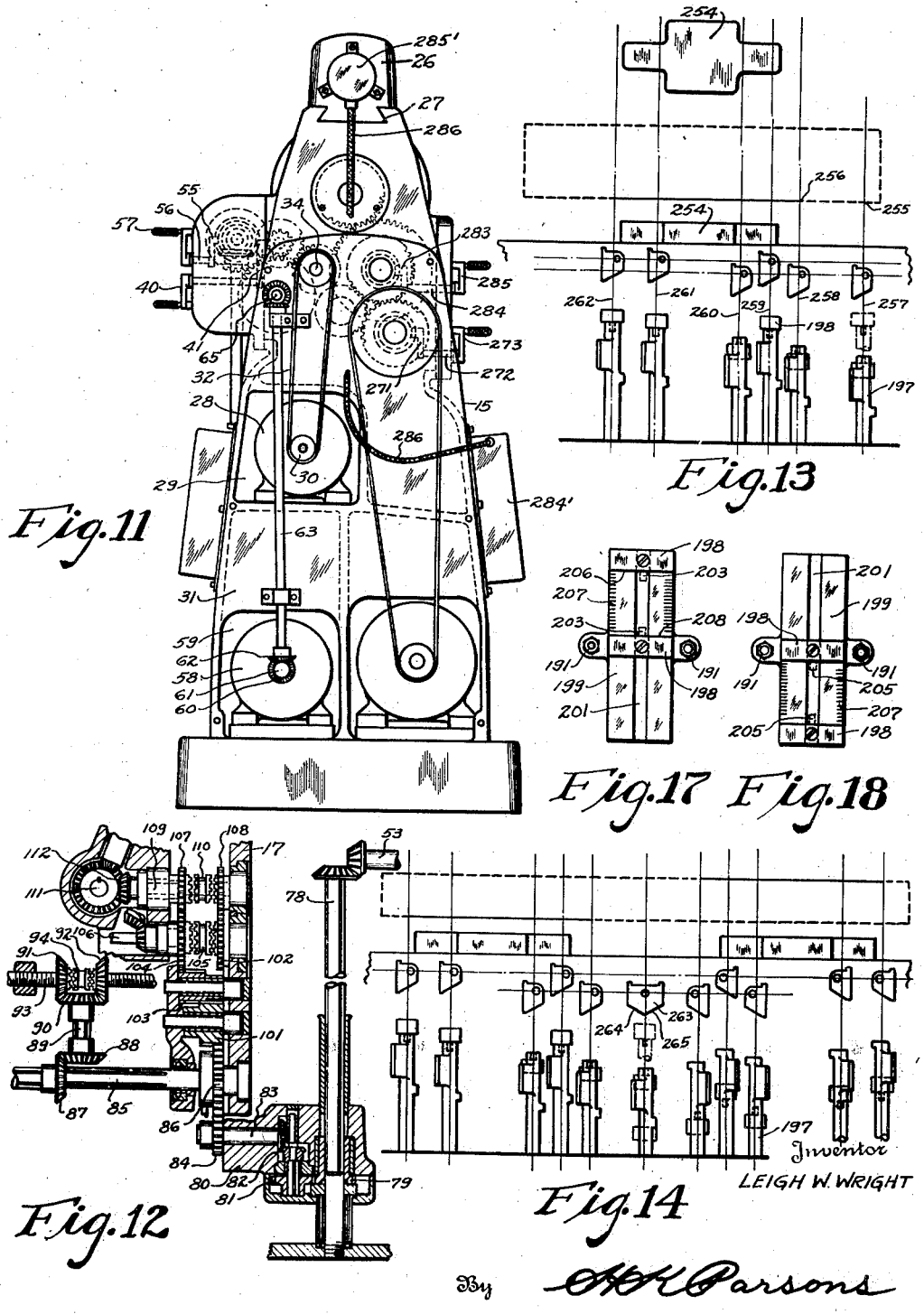

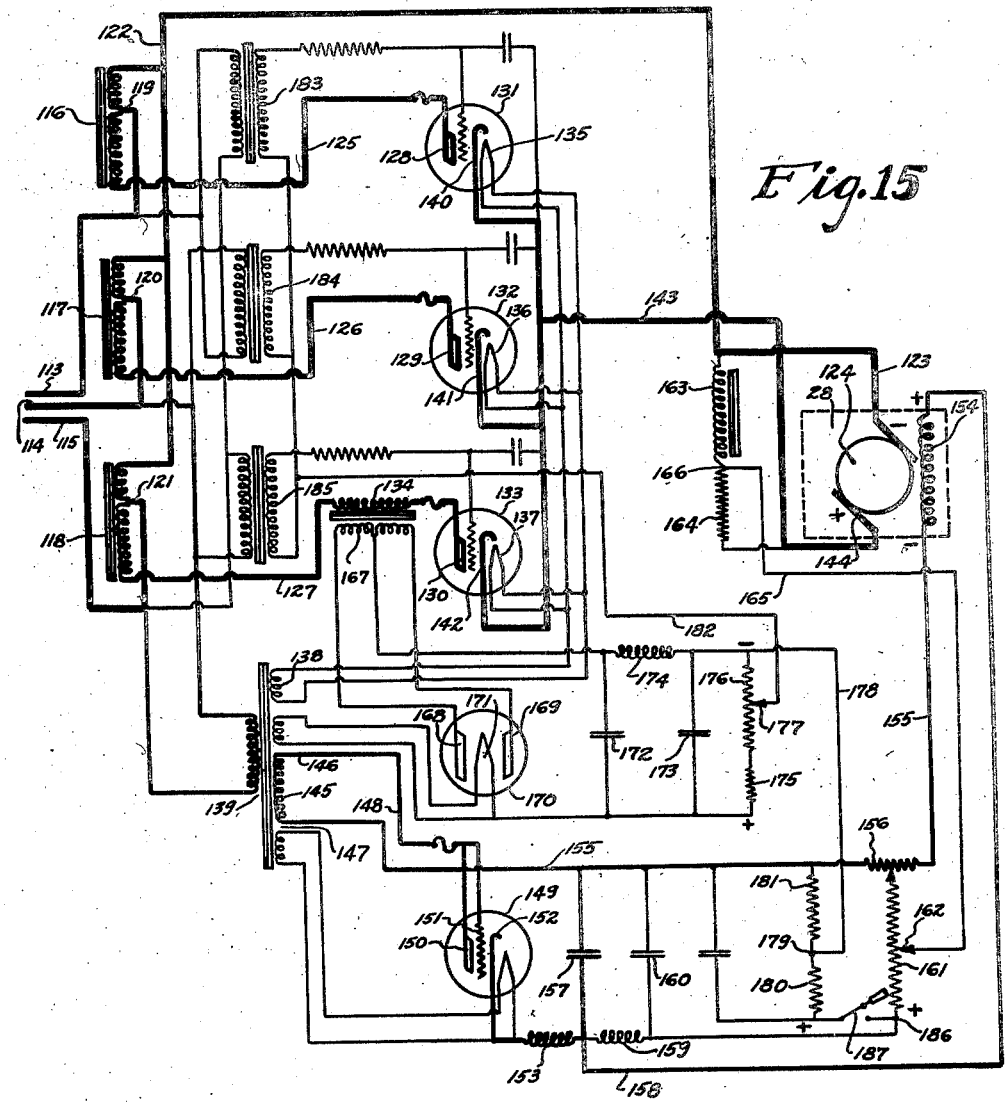

Patented Mar. 2, 1937

2,072,540

UNITED STATES PATENT OFFICE 2,072,540

MILLING MACHINE TRANSMISSION AND CONTROL MECHANISM

Leigh W. Wright, Norwood, Ohio, assignor to The Cincinnati Milling Machine Co., Cincinnati, Ohio, a corporation of Ohio Application January 2, 1935, Serial No. 111

33 Claims. (Cl. 90—21)

This invention relates to machine tools and more particularly to improved transmission and control mechanism therefor.

One of the objects of this invention is to improve the operation and control of machine tools in such a manner that the feed rate of a moving part may be automatically varied by trip dogs as often as desired, and to any desired value within the range of the feed transmission during continuous movement of the part.

Another object of this invention is to place the feed rate determination of a machine tool under control of trip dogs whereby any given cycle of variable feed rates may be predetermined at the time the machine is set up for its cycle of operation.

A further object of this invention is to eliminate the necessity and cost of providing feed rate control cams for variable feed cycles and to produce a control mechanism having a given set of parts which may be suitably prepositioned to yield any variable feed rate cycle of which the transmission is capable.

An additional object of this invention is to provide an electrically driven milling machine in which direct current motors may be utilized with an alternating current source so that variable rates may be obtained directly by varying the speed of the motor, thus eliminating the necessity of cumbersome and expensive variable speed gear boxes.

A still further object of this invention is to produce a simplified control for milling machines having a limited number of parts, but capable of yielding new and improved results.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

By referring to the drawings in which like or similar reference numerals indicate like or similar parts:

Figure 4 is a section on the line 4—4 of Figure 1 showing the arrangement of the trip control mechanism.

Figure 5 is a detail section on the line 5—5 of Figure 4.

Figure 6 is a section on the line 6—6 of Figure 1.

Figure 7 is a detailed section on the line 7—7 of Figure 1.

Figure 8 is a detailed section on the line 8—8 of Figure 6.

Figure 9 is an enlarged view showing the constructional details of the ratchet clutch mechanism associated with one of the trip plungers.

Figure 10 is a detailed view of one of the control dogs as viewed on the line 10—10 of Figure 4.

Figure 11 is a rear view of the machine shown in Figure 1 with parts broken away to show the arrangement of the various prime movers.

Figure 12 is an expanded view showing the transmission train for connecting the feed-rapid traverse selector to the movable elements of the machine.

Figures 13 and 14 are views showing different dog set-ups for yielding different feed cycles.

Figure 15 is an electrical diagram of the circuit by which a direct current driving motor may be connected to an A. C. source.

Figure 16 is a diagram of a supplementary control circuit.

Figures 17 and 18 are detail views showing the manner of rate graduating the control dogs.

It is conventional practice in machine tools to provide power operable means for effecting what is termed a relative feeding movement between the tool and work piece, which movement is utilized for doing the actual work of removing material and control means for varying this rate of movement in accordance with the character and amount of material to be removed during a given stroke between the work and tool.

This is true whether the cutter utilized is of the stationary type, such as a planing tool, or whether it is of the rotary type, such as a milling cutter. For the purpose of saving time during non-cutting movements, which have been termed positioning movements, a high speed drive is utilized, and trip control means provided whereby the moving part may be selectively connected thereto for movement at a relatively fast or quick traverse rate. Beyond this automatic selection between two rates, which may be termed feed rate and rapid traverse rate, no means has yet been provided in connection with machine tools whereby any one of a plurality of feed rates may be automatically utilized for varying the rate of table movement with the exception of the case where control cams are utilized. Control cams, however, are costly and are limited to one cycle, which means different cams must be laid out and produced for each different cycle desired. In the present invention a plurality of similar control dogs are provided for selective positioning at the points where changes in feed rate are desired, including an easily adjustable part prepositioned to yield any feed rate within the range of the feeding transmission.

Figure 1:
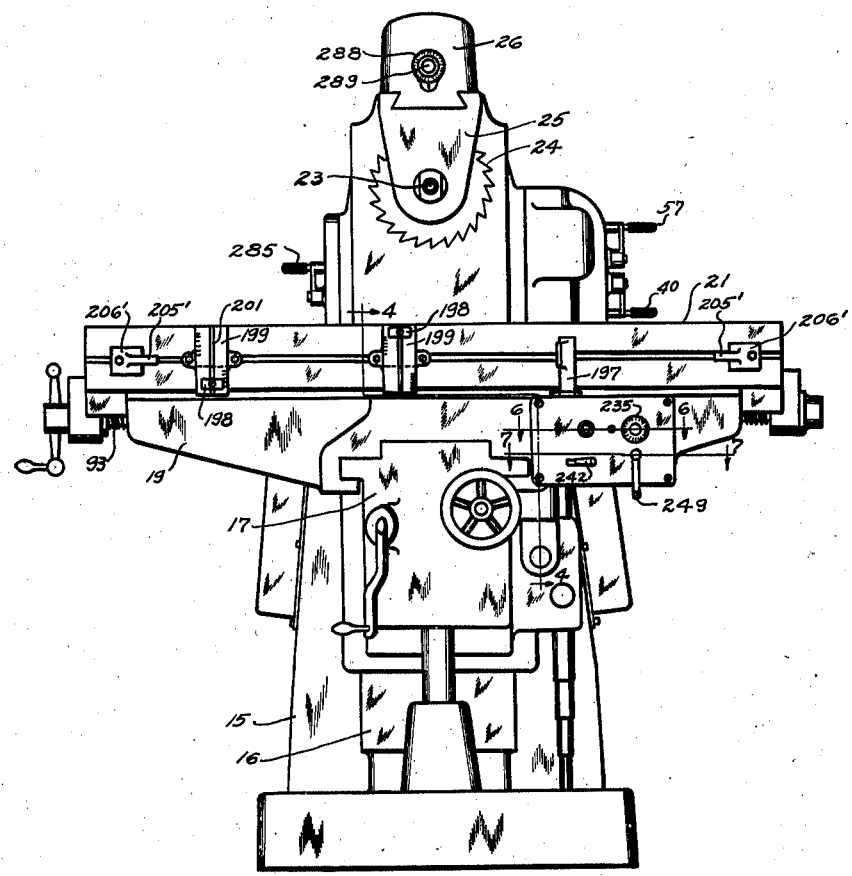
Figure 1 is an elevation of a machine tool embodying the principles of this invention.
Figure 2:
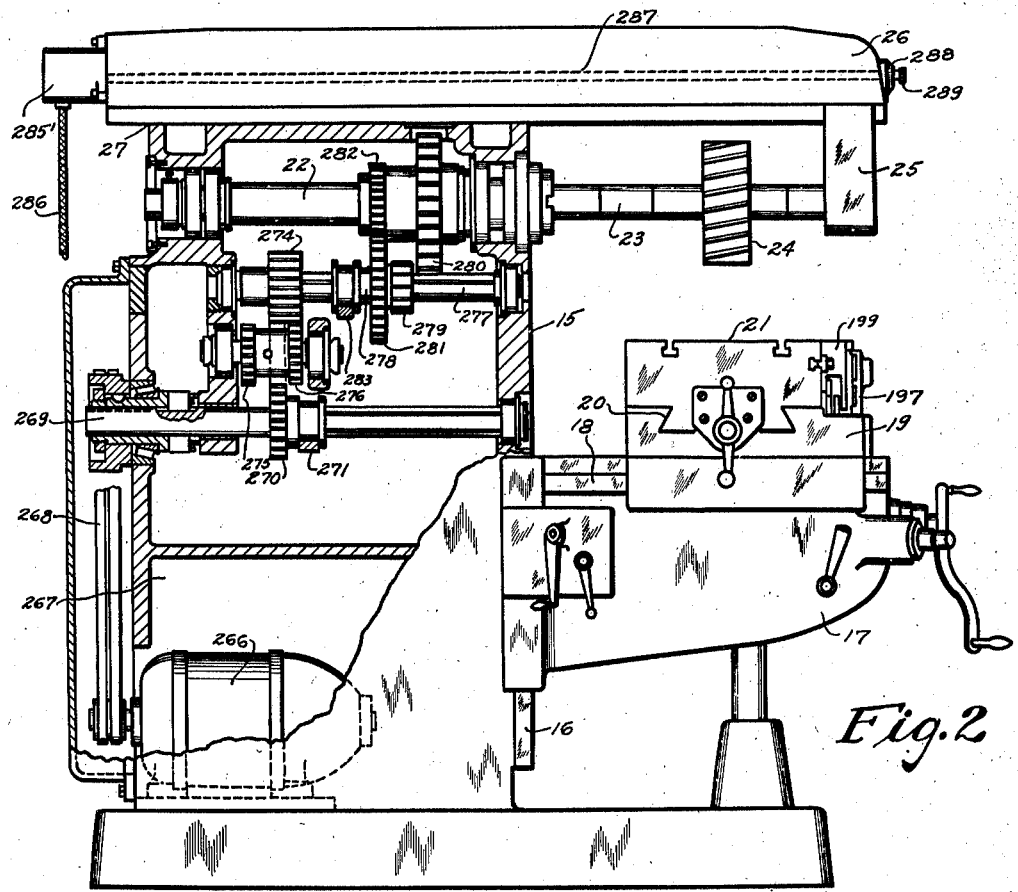
Figure 2 is a side elevation of the machine shown in Figure 1 as viewed from the left hand side of that figure and with parts broken away to show the spindle transmission.

A machine embodying the principles of this invention is shown in Figures 1, 2 and 11 and is structurally composed of a column 15 having vertical guideways 16 upon one face thereof for receiving and guiding a knee 17. The knee is provided with horizontal guideways 18 upon which is mounted a saddle 19 having guideways 20 extending transversely to the direction of guideways 18 for receiving and supporting a work table 21. A cutter spindle 22 is journaled in the upper part of the column for power rotating a cutter arbor 23 to which may be keyed a metal removing tool 24. The outboard end of the arbor may be supported by an arbor support 25 depending from the under side of an overarm 26, which overarm is longitudinally adjusted and supported in suitably formed guideways 27 formed on the top of the column.

Power means has been provided for translating the knee, saddle and table along their respective paths of movement and comprises two independent transmissions each actuable by its own prime mover, one of which may be termed the variable feed transmission and the other the rapid traverse transmission. Means are provided for selectively connecting these transmissions to a common intermediate power train and selector clutches individual to the respective supports for coupling the same to said common driving means.

The feed transmission comprises a direct current motor 28 mounted in a separate chamber 29 formed in the column, Figure 11, which chamber is open at the rear end of the machine so that the driving pulley 30 projects beyond the back face 31 of the column. This pulley is connected by suitable motion transmitting means, such as the belt 32, to a driven pulley 33 secured to the end of shaft 34, as more particularly shown in Figure 3. The shaft 34 has a gear couplet 35 secured thereto comprising a large gear 36 and a pinion 37.

A parallel shaft 38 is journaled in the column and has a gear couplet 39 splined thereon and movable by manually operable means, including the handle 40 and shifter fork 41, to selectively intermesh the gears 42 and 43 of the couplet with gears 36 and 37 respectively. The couplet 39 is a form of back gear for producing a high series or a low series of feed rates.

The shaft 38 has another gear 44 which is fixed thereto and intermeshes with a gear 45 which constitutes the final gear of the feed transmission. The gear 45 is in reality a safety gear and has an outer portion 46 constrained for movement with the inner portion 47 by spring pressed balls 48, and should the load become excessive there is a chance for slippage between the parts, thereby preventing possible damage to the transmission.

Fixed with the inner member 47 is a clutch member 49 which has clutch teeth 50 formed on one face thereof for interengagement with similarly formed clutch teeth 51 on the slideable clutch member 52 which is splined on the output shaft 53. The gear 45 and associated parts, including the member 49, are mounted for free rotation on a fixed sleeve 54 in which the shaft 53 is journaled. The clutch 52 is shifted by a shifter fork 55 secured to the shaft 56, which has an operating handle 57 on the exterior of the machine. The member 49 is really an overrunning clutch member and the clutch 52 is therefore normally in engagement therewith at all times so that when the shaft 53 is driven at a faster rate by the rapid traverse transmission, to be explained hereafter, a member 49 will overrun with respect to the member 47.

The rapid traverse transmission consists of a prime mover 58 mounted in a chamber 59 formed in the column, which has a bevel gear 60 secured to the end of the armature shaft 61 thereof which gear intermeshes with a bevel gear 62 keyed to the end of the upwardly extending shaft 63.

Figure 3:
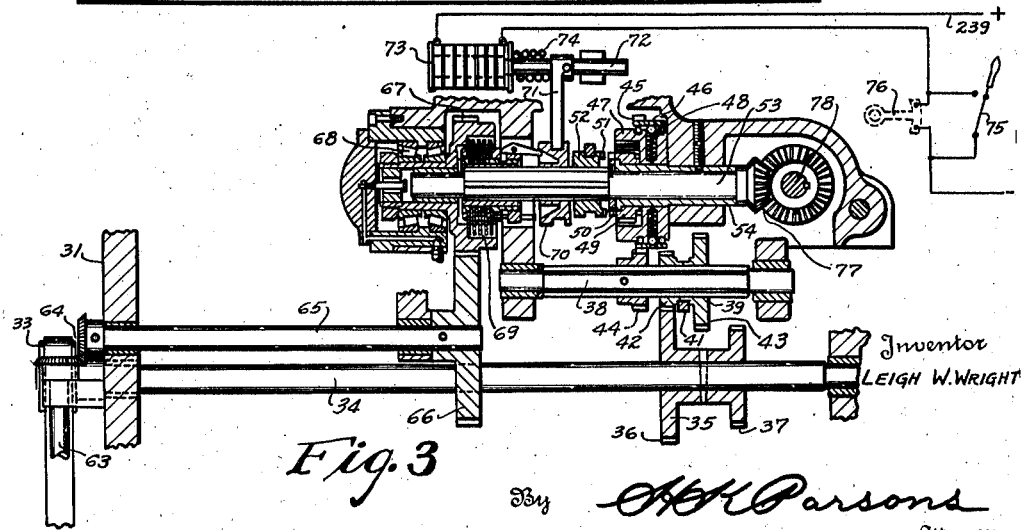
Figure 3 is a view of the feed-rapid traverse selector mechanism and the driving connections.

The shaft 63, as shown in Figure 3, is connected by a pair of bevel gears 64 to shaft 65, which is journaled in the column parallel to shaft 34. A spur gear 66 is fixed to the end of shaft 65 and drives the final gear 67 of the rapid traverse transmission. This gear is journaled in anti-friction bearings 68 and is connectable to shaft 53 by a multiple disc friction clutch indicated generally by the reference numeral 69. This clutch is operated by a shifter 70 having a shifter fork 71 pinned or otherwise securely fastened to shifter rod 72.

The shifter rod is slideably mounted in a solenoid 73 whereby energization of the solenoid will cause engagement of the rapid traverse clutch. A spring 74 is interposed between the end of the solenoid and the shifter fork 71 for normally maintaining the rapid traverse clutch disengaged. Energization of the solenoid may be controlled by the manually operable switch 75 or the automatically controlled switch 76. These switches are in parallel so that closing of either one will effect engagement of the rapid traverse clutch.

It will now be obvious that the shifter 71 constitutes a feed rapid traverse selector because upon movement in one direction the rapid traverse transmission is connected to shaft 53, and upon movement in the other direction it permits the feed clutch to become effective to rotate shaft 53 at a feed rate.

The shaft 53 is operatively connected by a pair of bevel gears indicated generally by the reference numeral 77 to a vertical shaft 78, which, as shown in Figure 12, has a spline connection with a spur gear 79 journaled in a bracket 80 carried by the knee 17. The spline connection thus maintains an operative connection between the shaft and gear for all vertical movements of the knee. The gear 79 interengages with a spur gear which drives a pair of bevel gears indicated by the reference numeral 82, which, in turn, rotate through the shaft 83, the gear 84. A spline shaft 85 is journaled in the knee parallel to shaft 83 and has a gear 86 on one end meshing with gear 84 and a bevel gear 87 splined thereon for actuating the table. The gear 87 is journaled in the saddle and therefore is movable longitudinally of shaft 85 in accordance as the saddle is moved. The gear 87 drives through the bevel gear 88, shaft 89 and bevel gear 90, a pair of bevel gears 91 and 92 in opposite directions. The gears 91 and 92 are mounted for free rotation with respect to the table lead screw 93 and are alternately connectable thereto by intermediate clutch member 94 which has a splined connection with the lead screw and clutch teeth on opposite ends for interengagement with clutch teeth on the opposing faces of the gears. This constitutes a reversing mechanism for the table.

As shown in Figure 5, the clutch 94 has a shifter arm 95 which is fixed to the shifter rod 96, which in turn is slideably supported at opposite ends in a pair of solenoids 97 and 98 respectively. Springs 99 are interposed between the ends of respective solenoids and the shifter arm 95 for normally maintaining the clutch in a central position and a spring pressed detent 100 serves to aid in this connection. It will be obvious that upon energization of either solenoid 97 or 98 that the clutch will be shifted in opposite directions, and upon de-energization of both solenoids, that the springs 99 and the detent member will serve to position the clutch in a central or neutral position.

The gear 86 in Figure 12 drives gear 101, which is directly intermeshed with spur gear 102 and indirectly connected through idler 103 to gear 104 whereby the gears 102 and 104 will be rotated in opposite directions. These gears have clutch teeth formed on opposing faces thereof which are selectively engageable by the shifter clutch member 105 which constitutes the reversing clutch for the saddle drive shaft 106 to which the saddle member 105 is splined.

The gears 104 and 102 rotate respectively a pair of gears 107 and 108 journaled for free rotation on the knee elevating screw drive shaft 109 and have clutch teeth formed on opposing faces for interengagement with similarly formed clutch teeth of the shiftable clutch member 110 splined on shaft 109. The clutch 110 constitutes a reverser for determining the direction of movement of the knee, the shaft 109 being connected with the knee elevating screw 111 by a pair of bevel gears indicated generally by the reference numeral 112.

The electrical circuit by which the direct current motor 28 is connected to an alternating current source is shown in Figure 15 and the particular form of this circuit does not constitute a part of the present invention, it being understood that any suitable form of circuit may be substituted therefor. Since the details of the circuit and its manner of operation are more fully described and explained in a co-pending application of W. H. Howe for "Voltage regulation and circuits therefor", Serial No. 668,582, filed in the United States Patent Office on April 29, 1933, it will be only briefly described herein.

The input power is supplied at 220 volts, 60 cycles, 3 phase, represented by the leads 113, 114 and 115. These leads are Y-connected respectively to auto transformers 116, 117 and 118. More particularly, they are connected to the low potential taps 119, 120 and 121 of these transformers whereby the output voltage is increased over the input voltage. The output of one leg of each of the transformers is connected to a common line 122 which leads to the negative terminal 123 of the motor armature 124. The high voltage from the other leg of these transformers goes through lines 125, 126 and 127 to plates 128, 129 and 130 respectively of power rectifier tubes 131, 132 and 133. The line 127 has a series transformer 134 therein which operates the compounding circuit connected thereto.

The tubes 131, 132 and 133 have filaments 135, 136 and 137 respectively which are supplied with current from the secondary 138 of an auxiliary transformer 139. The cathodes 140, 141 and 142 of the respective tubes are connected as by a common lead 143 to the positive terminal 144 of the motor armature 124. Thus the main power circuit is from the common cathode connections of the tubes 131, 132 and 133 through the motor armature back to the common point of the Y-connected transformers 116, 117 and 118, through these transformers to the respective plates of the rectifier tubes and back to the common cathode connection. This provides a source of rectified current for the armature of motor 28.

Another circuit provides rectified current for the motor field circuit and control system therefor and comprises another secondary 145 of auxiliary transformer 139 having two terminals 146 and 147. The terminal 146 is connected by a line 148 to the anode of the rectifier tube 149. As shown, this rectifier tube has a plate 150 and a grid 151 connected together to serve as an anode. The cathode 152 of this tube connects through a filter choke coil 153 to the positive side of the motor field 154. The negative side of the field coil is connected by line 155 and current limiting resistor 156 to terminal 147 of the secondary 145. A condenser 157 is connected across the leads 155 and 158. The supply for the motor field thus consists of the transformer secondary 145, the tube 149, the choke coil 153, the condenser 157 which, in turn, is connected to the terminal 147 of the coil 145. Across this circuit is connected the output circuit for the motor field, one end of the field being connected to one side of the condenser 157 and the other end of the field being connected through the resistor 156 to the other side of the condenser 157.

Across this output circuit is connected the direct current control circuit which includes a choke coil 159 connected to line 158 and thereby to the positive side of the motor field coil and a condenser 160, which in turn is connected to line 155 which leads to the negative side of the motor field coil. There is also connected to the choke coil the positive end of the main speed control potentiometer or rheostat 161. The negative end of this potentiometer is connected part-way of the resistor 156 which limits the field current of the motor. The adjustable slider 162 of the potentiometer, which may correspond to the rotating arm of a rheostat, connects the potentiometer to the armature filter comprising an iron core inductance 163 and the resistance 164 which are arranged in series, the lead 165 from the slider 162 being connected to their common point 166. The other end of the inductance is connected to the negative terminal of the motor armature and the other end of the resistance 164 is connected to the positive terminal of the motor armature 124. This system thus transmits the direct current potential of the armature but blocks the alternating current potential.

In addition to the above circuits there is a compounding circuit which derives its input from the series transformer 134, previously referred to, and the output from this transformer through the secondary 167 is proportional to the alternating component, and hence the direct current output of the rectifier tube 119, and since the rectifier tubes 131, 132 and 133 share the load equally it is proportional to the total output current. The outer ends of the winding 167 are connected to the two plates 168 and 169 of the full-wave rectifying output 170. The filament 171 of this tube connects to the positive side of a filter circuit comprising two condensers 172 and 173 and the inductance 174. Across the condenser 173 is connected the auxiliary or compounding potentiometer which comprises the two resistors 175 and 176. The resistance 175 is fixed and the resistance 176 is provided with a slider 177. The negative end of this potentiometer connects through the lead 178 with the point 179 of the fixed divider resistances 180 and 181 and the slider E connects through the lead 182 with the phasing transformer secondaries 183, 184 and 185.

The potential of point 166 is negative with respect to the potential of the line 143 by an amount equal to the direct current potential across the armature of the motor. The potential of the point 186 is positive with respect to the potential of the point 166 by an amount proportional to the setting of the slider 162 of the main speed control potentiometer 174. When the slider is at the positive end this voltage is zero; when the slider is at the negative end this voltage is at its maximum. The potential at the point 179 is negative with respect to the potential of the point 186 by a fixed amount, in the present instance about 20 volts determined by the ratio of resistances 180 and 181 and the direct current potential of the control circuit. The potential of the point of the slider 177 is positive with respect to the potential of the point 179 by an amount proportional to the current flow in the armature of the motor. Thus, the direct current potential applied to the grids of the tubes 131, 132 and 133, which is substantially the same as the potential of the point of the slider 177 as compared with the potential of the cathodes of these tubes, which is the potential of the line 143, is equal to the sum of the potential of the main speed control potentiometer plus the potential of the compounding circuit minus the sum of the fixed voltage divider potential plus the voltage on the armature of the motor. Thus the main control is effected by the difference of the motor voltage and the control direct current voltage, any variation in certain conditions being accompanied by a shift of the direct current potential on the grids in such a manner that the plate current flow as controlled by the grids so result in a load voltage having a fixed relation to the controlling direct current voltage. To this is added the voltage from the compounding circuit so that the difference between the load voltage and the direct current voltage can be made to vary the load in any desired fashion, resulting in a load voltage which may be constant regardless of load or which may either increase or decrease as the load increases.

The compounding system is a means for offsetting the effects tending to reduce or increase motor speed. Since the compounding component depends almost entirely on current flow it is equally effective for maintaining constant motor speed throughout a 20-1 range of motor speed without adjusting the system. A control switch 187 completes the circuit between the positive side of the main speed control potentiometer 161 and the fixed voltage divider and provides for normal operation. When the switch is open this connection is opened, which leaves the voltage divider 180 connected to the circuit only at its negative end, which thereby changes the potential at point 179. This change in potential reacts in such a manner on the rectifying tubes 131, 132 and 133 that they are prevented from passing any current and the armature power is thus cut off from the motor. The electrical system shown in Figure 15 briefly comprises an input circuit and an output circuit for the motor armature, connecting means between the two circuits for rectifying the current, a second input and output circuit for the field with a connecting means between the circuits for rectifying the current to the motor field, a compound circuit which maintains the speed of the motor constant under varying load conditions and a control circuit including a potentiometer so connected to the armature and field circuits that it may vary the speed of the motor.

The potentiometer coil may assume arcuate form so that the slider 162 may be in the form of a pivoted arm rotatable about a fixed center for movement over the coil. Such a form of potentiometer is enclosed in the casing 188 shown in Figure 6 of the drawings, and the arm which is not shown is secured to the shaft 189 which passes through the casing 188. The shaft 189 is rotatable through an angle of substantially 270° but the angle of arcuate movement of the potentiometer slider is a little less than this. The reason for this is that the shaft is rotatable through an angle less than 270° to effect the full range of feed motor speeds so that upon final movement through the last few degrees a circuit may be closed to effect a rapid traverse connection, while the feed motor is still running at its highest rate.

The means for controlling the rotation of shaft 189 and thereby the setting of the potentiometer will now be explained. A control dog 190, Figure 10, is secured to the front face of the table by means of the usual T-headed bolts 191 and the dogs utilized for controlling the feed rate when the table is moving toward the right have a pivoted latch lever 192 which is beveled on the lower right hand corner as at 193 for depressing trip plunger 194. Clockwise rotation of the latch member is prevented by a shoulder 195 formed on the upper left hand corner thereof but the upper right hand corner is rounded as at 196 to permit the latch member to pass over the plunger 194 when the table is moving toward the left without depressing the plunger.

Dogs which control the feed rate during movement of the table to the left are similarly formed with the exception that the member 192 is made to the opposite hand for operating trip plunger 194 during movement of the table to the left, but capable of passing over the trip plunger without effecting movement thereof during movement of the table toward the right. This constitutes two forms of trip dogs which are both utilized regardless of the direction of table movement for increasing the feed rate of the table. In other words, depression of the plunger 194 will cause, through mechanism to be explained, upward movement of the main control plunger 197. The amount of this upward movement will depend upon a prepositionable feed rate determinator 198 which is secured to the front face 199 of the control dog by a T bolt 200 vertically adjustable in a T slot 201 formed centrally of the face 199.

A second plunger 202 is mounted in front of the plunger 194 for cooperation with a second pair of latch members similar to the first pair except that they depend in the plane of the plunger 202 for cooperation therewith and will not in any way interfere with plunger 194. This last pair of latch members will be carried by separate dogs with the result that the machine is provided with four different types of dogs.

Each dog will have a different type of latch member with the result that there will be one dog for increasing the feed rate during movement of the table toward the right, a second dog for increasing the feed rate during movement of the table to the left, a third dog for decreasing the rate of movement of the table toward the right, and a fourth dog for decreasing the rate of table movement toward the left.

The trip plunger 197 has a first lug 203 which projects into the path of member 198 when the plunger 197 is rotated clockwise as viewed in plan to the position shown in Figure 1. This rotation is effected by a wing 204 projecting from the side of the plunger in a direction away from the table for cooperation with the encircling fingers 205 of reversing dogs 206. When the plunger 197 is rotated clockwise the lug 203 is withdrawn and a second lug 205 moved into the path of stop 198. The manner of controlling the plunger 197 in order to determine the feed rate will be more fully understood by reference to Figure 17. In that figure the stop 198 is midway vertically of the front face of the control dog. When in this position the feed rate is zero.

The dogs which control the feed rate during movement of the table toward the right have graduations only on the upper half thereof, as shown in Figure 17, while the dogs that control movement of the table to the left have graduations on the lower half thereof. The reason for this is that in spite of the fact that the vertical position of the plunger is the same for each of the given feed rates, yet the upward and downward movement of the plunger is controlled in one case by the upper lug 203 and in the other case by the lower lug 205. Incidentally, the fact that both of the control dogs which control movement of the table in one direction have their graduations on the upper half thereof and the control dogs that control the other direction of movement have the graduations on the lower half thereof, aid in distinguishing the dogs when selecting them during the set-up of the machine.

Referring to Figure 17 it will be apparent that in order to limit upward movement of lug 203 that the member 198 must be placed above the lug and therefore the position of the lower surface 205 of member 198 is the controlling surface and the graduations 206 on the left side of the dog are provided with this idea in mind so that the surface 205 can be placed in alignment with any of the graduations to determine the amount of upward movement and thereby the feed rate effected for any given position.

It will also be obvious that in order to limit downward movement of the lug 203 that the member 198 must be placed beneath the lug. In this case the upper surface 207 of member 198 is now the determining surface and therefore the graduations on the right hand side of the dog are provided so that this surface may be spaced in alignment with the graduations. This eliminates the necessity for taking into consideration the thickness of lug 203 and making corrections therefor. In other words, the graduations on the right hand side are utilized for setting member 198 to determine a decrease in feed rate and the graduations on the left for determining an increase in feed rate, it being remembered that the answer to the question of whether a feed rate is an increase or a decrease can only be found by referring to the previous rate setting dog and if the new rate desired is greater than the present rate the left hand scale and the bottom surface of member 198 must be utilized in setting the member, whereas if the new rate is lower, then the graduations on the right hand side and the upper surface of member 198 must be utilized in setting the member.

The same thing is true with respect to determining feed rate in the opposite direction except that the control dog has graduations on the lower half thereof as shown in Figure 18 and the member 198 is set above or below the lug 205 for limiting the movement thereof. It will be noted that the plunger will have the same vertical position for all rates because whether the lug 205 is cooperating with the under side of member 198 as shown in Figure 18, or the lug 203 cooperating with the under side of member 198 as shown in Figure 17, the highest feed rate will be obtained and the plunger will be in the same position vertically.

The particular mechanism for moving plunger 197 will now be explained. The plunger 194 in Figure 9 is reciprocably mounted in a bore 209 and has a spring 210 surrounding a reduced portion 211 thereof for exerting a continuous upward movement of the plunger. The reduced portion 211 projects through a threaded plug 212 which closes the lower end of the bore 209, forms a shoulder for the lower end of the spring, and acts as an abutment by engagement with lock nuts 213 threaded on the end of the reduced portion 211. The plunger 194, therefore, always returns to the same vertical position and automatically after the latch member has passed over it.

The member 194 has rack teeth 214 formed on one side thereof which interengage with the annular gear 215. This gear surrounds a roller clutch member 216 for actuation of shaft 217 in one direction only. In other words, the balls 218 which are equally spaced about the periphery of member 216 are wedged in one direction upon counterclockwise rotation of gear 215 to effect rotation of member 216 and thereby of the shaft 217. Upon upward movement of plunger 194 by the spring 214 the balls are moved in the opposite direction, thereby freeing the member 216 from the gear, and the gear returns without causing rotation of shaft 217. The plunger 202 is connected by the same form of mechanism for effecting rotation of shaft 217 in a clockwise direction.

The member 216 is connected by a friction clutch member 219 to a beveled gear 220, the amount of the friction depending upon strength of spring 221. This friction should be great enough to cause movement of the parts, but still weak enough to permit slippage because the downward stroke of plunger 194 is always the same, but the amount of upward or downward movement of plunger 197 is determined by the position of member 198. Therefore, the theory of operation is that the plunger 194 will always be given the same length of stroke by the latch pawl but the amount of movement that will be imparted to the plunger will be limited by member 198 and during the remainder of the movement slippage will take place at the friction clutch. In other words, the downward movement of the plunger 194 is sufficient to move plunger 197 the full distance from zero rate to the highest feed rate, but should a lesser movement be required the same may be obtained by the limiting stop 198.

The bevel gear 220 meshes with bevel gear 222 which is keyed to the end of shaft 223, the shaft having a similar bevel gear 224 secured to the other end thereof in mesh with a bevel pinion 225. This pinion is integral with shaft 226 which has keyed thereto a spur gear 227 meshing with gear 228 fixed to the end of shaft 189. From this it will be seen that the downward movement of plunger 193 will effect counterclockwise rotation of shaft 189 as viewed from the outer end thereof.

The plunger 202 is connected by the same form of means to a bevel gear 229 which intermeshes with bevel gear 222, but in this case downward movement of plunger 202 will cause reverse rotation of bevel gear 222 and therefore through the intervening mechanism will cause clockwise rotation of shaft 189 and thereby a reduction in the feed rate. The bevel gear 229 is secured to a spur gear 230 which intermeshes with annular rack teeth 231 formed on plunger 197, as more particularly shown in Figure 8. Thus, the upward or downward movement is imparted to plunger 197 depending upon which of plungers 194 or 202 is depressed.

The gear 230 also meshes with a gear 232 which intermeshes with a pinion 233 which is mounted for free rotation with respect to shaft 189. This pinion has an elongated hub which projects to the outside of the machine to which is secured the rate dial 234. This dial has a beveled edge 235 upon which may be scribed suitable graduations for visibly indicating the feed rate setting of the potentiometer.

The annular teeth 231 on plunger 197 permit rotation thereof by the reversing dogs without breaking the operating connection with gear 230 and this rotation is utilized to control a reversing switch for solenoids 97 and 98 shown in Figure 5. The lower end of the plunger is splined into a switch member 236, more particularly shown in Figures 7 and 8. This switch member carries an insulated contact 237 which is connected by a flexible lead 238 to a supply line 239. This contact is adapted to close the circuit to solenoid 98 upon clockwise rotation of plunger 236 by engagement with contact 240 and to close the circuit to solenoid 96 upon counterclockwise rotation by engagement with contact 241.

The member 236 may also be manually rotated by the handle 242. Means have also been provided for holding the member 236 in either one of its two positions comprising a spring pressed detent 243 which cooperates with a pair of indents 244 and 245 formed in the periphery of member 236. From this it will be seen that the member 236 has only two positions, both of which are running positions. Since the plunger 231 can be moved to a position to stop the feed motor, and since when it is moved to this position, the feed clutch is engaged, it is possible to stop the machine automatically by use of plunger 231 which eliminates the necessity for providing a separate stop plunger as might ordinarily be the case when the reversing clutch does not have a neutral position. Attention is invited to the fact that, even though the machine is stopped in this manner, still the transmission is in such condition that rapid traverse is always available when the machine is stopped by closing the manually operable switch 75.

It will be recalled in connection with the description of the control dogs that the setting of the stop member 198 depended upon the position of the previous stop member because the position in which the plunger was put by the previous dog determines whether the next set- ting is to be an increase or a decrease. For this reason, it is important that after the plunger 231 has been positioned as by a previous dog that nothing disturb that position, because the next dog setting is dependent upon that position, and if it should be accidentally moved to some other position the possibility of damage to the parts would arise. Therefore, the manual means which have been provided for changing the rate is so constructed that it cannot be inadvertently moved, but can only be adjusted under predetermined conditions. This means comprises a gear 246 having an elongated hub by which it is journaled in the wall of the machine, the hub having clutch teeth 247 formed on one end thereof for interengagement with clutch teeth 248 formed on the boss of operating handle 249. This handle is secured to the end of a rod 240, which extends axially through the center of gear 246, and provided on the inner end with a cone-shaped head 250. This head is adapted to enter a similarly shaped notch 251 formed in the side of the interlock bar 252. This bar is pivotally connected at 253 to switch member 236. Since the switch member has only the two positions as determined by the detent 243, it will be apparent that the bar 252 is normally in a position to prevent engagement between the clutch teeth 247 and 248. Therefore to effect manual operation it is necessary first for the operator to grasp handle 242 and move the switch member 236 to a substantially central position and manually hold it there while he moves the handle 249 inward to interengage clutch teeth 247 and 248. Having done this, he is in a position to rotate handle 249 to any desired feed rate position and then control the direction of movement of the table by moving handle 242. It is intended that the operator shall continually grasp the handle 242 throughout this operation in order to stop the machine at any time in case of any interference between the main trip plunger and control dogs, which might cause damage to the parts. It is primarily intended that this mechanism be used only for set-up purposes of the machine.

In Figures 13 and 14 there are shown some typical set-ups to facilitate understanding of the operation of the machine and these are not to be considered as limiting since it is obvious to those skilled in the art that numerous other set-ups may be made, depending upon the shape of the work and the feed rates desired at various points during the milling operation. In Figure 13 it is assumed that a work piece, such as 254, is to be milled, the work piece having narrow portions at each end and a wide portion in the middle. In this case the work piece is placed on the table 21 to the left of the cutter as shown in Figure 1 and of course properly secured by suitable clamping means. The point 255 is the stopping and starting position, and therefore, once the machine is started the trip plunger 197 will be at the lower extreme of its travel. In order to quickly bring the work into engagement with the cutter, the rate of travel between the point 255 and 256 will be at rapid traverse, and therefore to start the machine the operator moves the reversing switch 242 to a central position and rotates the handle 249 and thereby the shaft 189 to a rapid traverse position. In doing this the plunger 197 is raised from its full line position to the dotted line position on ordinate 257. This will cause rotation of shaft 189 and movement of switch lever 76 connected therewith to a position where it will close the circuit to the rapid traverse solenoid 73, as more particularly shown in Figure 3. If the operator now returns handle 242 in the proper direction the table will move at a rapid traverse rate toward the right.

It is usually desired when the cutter first engages a work piece that it do so at a very slow rate so as to prevent undue shock to the parts. This may now be accomplished by placing a control dog on the ordinate 258 which will act on plunger 202 to lower the plunger 197 and thereby decrease the rate of table movement from rapid traverse to a very low feed rate.

After the cutter has started the cut, the feed rate may be stepped up as by a dog placed on the ordinate 259 which will operate on plunger 194 to raise the main control plunger 197 to a position determined by the stop 198.

Having completed the narrow portion of the work piece it may be desired to change the feed rate again as the cutter engages the wider portion of the work and this may be effected by placing a dog on the ordinate 260 which will, through plunger 194, depress the main plunger 197 to reduce the feed rate a suitable amount. It will be obvious that this rate may be greater than the rate established on ordinate 258, but less than the rate established at ordinate 259.

When the wide portion of the work has been completed another dog may be placed on ordinate 261 to raise the feed rate again to that equal to the rate established at ordinate 259. The cutter, having finished the work at ordinate 252, a dog may be placed at this point to raise the plunger to its extreme upper or rapid traverse position and at the same time suitably position a reversing dog to rotate plunger 197 and thereby change the direction of table movement. The table will now return at a rapid traverse rate until the plunger 197 is rotated again by a second reversing dog which will thereby change the direction of table movement and cause advance at rapid traverse rate to the ordinate 255, at which point a dog may be positioned to depress the plunger to a stop position. Thus any sequence of feed rates may be obtained in a single reciprocating cycle of the machine, and it will be noted that the same plunger is utilized for effecting, not only the various feed rates, but also the rapid traverse rate and the starting and stopping of the machine. Should anything go wrong during a machine cycle, the operator has merely to throw lever 242 to its central position and rotate lever 249 to permanently stop the machine.

In Figure 14 the various dog settings are shown, if a continuous reciprocating cycle is desired, and two work pieces similar to 254 are to be milled alternately by the cutter. In this case, the cycle for each work piece is the same with the exception that the stop position corresponding to that shown at ordinate 257 in Figure 13 may be selectively utilized if it is desired to stop the machine after the milling of each work piece to insure that the operator has finished clamping the new work piece. If it is so desired, a stop dog having a pawl 263 may be utilized, this pawl having two beveled faces 264 and 265 for operating plunger 202 in both directions of movement. In such a case two stop members 198 will be secured to the face of the dog 200 so that when the trip plunger is depressed in its different rotative positions, one will cooperate with lug 203 and the other will cooperate with lug 205.

The spindle transmission is shown more particularly in Figure 2 and comprises a prime mover 266 which is mounted in a chamber 267 formed in the base of the machine and connected, as by a belt 268, to shaft 269. This shaft has splined thereto a shiftable gear 270 which is moved by a shifter fork 271 secured to the end of shaft 272, Figure 11, which in turn is rotated by the manually operable handle 273 secured thereto. This gear is utilized for changing the direction of spindle rotation and in one position intermeshes directly with gear 274, and in its other position intermeshes with gear 275 which has integral therewith the idler 276 engaging gear 274.

The gear 274 is splined on shaft 277 which also has a shiftable gear couplet 278 in the form of back gears comprising a pinion 279 adapted to intermesh with the large gear 280 and a gear 281 adapted to intermesh with gear 282. This couplet is shifted by a shifter fork 283 secured to the end of shaft 284, Figure 11, having a manually operable handle 285 secured thereto.

The gears 282 and 280 are secured on the cutter spindle 22 for effecting rotation thereof and the rate of this rotation is primarily determined by varying the speed of motor 266 through an electrical control circuit similar to that shown in Figure 15 for motor 28. In other words, this electrical control circuit is mounted in a housing 284 carried on the side of the machine as shown in Figure 11, the potentiometer of that circuit being enclosed in a housing 285 carried on the end of the overarm 26 and connected by a suitable electric cable 286 to the electrical devices in box 284.

As shown in Figure 2, the potentiometer in housing 285 has a control shaft 287 which extends through the overarm to the front end thereof, where it is provided with a graduated dial 288 and an operating knob 289. By this means the operator can directly change the speed of rotation of the spindle from the front of the machine and without leaving his operating position. By use of the back gears, two series of rates are obtainable so that for light work a first series of rates is provided and for heavy work a second series of rates is obtainable.

There has thus been provided an improved transmission and control mechanism for a milling machine having an improved flexible control whereby a series of different feed rates may be automatically obtained during operation of the machine and the rate of spindle rotation may be varied from the operator's position at the front of the machine with practically no inconvenience.

I claim:

1. In a milling machine having a tool support and a work support, the combination of electrical means for effecting relative movement therebetween which may be energized from an alternating current source but speed controlled in a manner similar to direct current control, comprising an electric prime mover, a transmission train connecting the prime mover for effecting said relative movement, circuit means coupling the prime mover to an alternating current source, said circuit including means for rectifying the current whereby the prime mover may be of the direct current type, and a variable electrical resistance means remote with respect to the prime mover and the remainder of the circuit for varying the speed of the prime mover and thereby the rate of said relative movement.

2. A transmission and control mechanism for effecting relative movement between the work support and tool support of a machine tool at different feeding rates, comprising a variable electrical resistance means, an adjustable-speed electric prime mover, means for coupling the prime mover to an energy source which normally renders variable-resistance speed control ineffective, said coupling means including means for rendering variable resistance speed control means effective, and manually operable means located adjacent said work support for adjusting said resistance.

3. A transmission and control mechanism for effecting relative movement between the work support and tool support of a machine tool at different feeding rates, comprising a variable electrical resistance means, an adjustable-speed electric prime mover, means for coupling the prime mover to an energy source which normally renders variable-resistance speed control ineffective, said coupling means including means for rendering variable resistance speed control means effective, manually operable means located adjacent said work support for adjusting said resistance, and dial means associated with said manually operable means for indicating the feed rate effected for different adjustments of said resistance.

4. In a machine tool having a cutter spindle and a work support, the combination of a feed transmission for effecting relative movement of the table with respect to said spindle including an electrical prime mover, a source of current, a control circuit for coupling the source to the prime mover including variable electric resistance means for varying the speed of the prime mover and thereby the rate of said relative movement, and means under control of the table for intermittently varying said resistance at predetermined points in the travel thereof to change the rate of feed during continuous movement of the table, including dogs carried by the table, and a resistance control plunger adapted to be moved predetermined amounts by said dogs in accordance with the amount of change desired in said resistance means.

5. In a machine tool having a tool support and a work support, the combination of means for moving one of said supports relative to the other at a plurality of different feeding rates including a train connected for support movement, a direct current prime mover for actuation of the train, a source of alternating current, a rectifying circuit for coupling the source to said prime mover and including adjustable resistance means capable of yielding a plurality of rates in the prime mover, and means under control of the table and effective on said circuit at predetermined points in the travel thereof for automatically adjusting said resistance to yield new rates.

6. In a machine tool having a tool support and a work support, the combination of variable power transmission means connected to one of said supports for effecting relative movement thereof with respect to the other support, said transmission means including a rate control plunger axially movable to a plurality of positions, motion transmitting means coupling the plunger for varying the feeding rate yielded by said transmission, said plunger being movable in one direction for increasing said feed rate, and in an opposite direction for decreasing said feed rate; and a plurality of trip dogs positionable on the movable support for intermittently moving said plunger to different of said positions whereby several feeding rates may be obtained during a single uni-directional movement of the moving support.

7. In a machine tool having a tool support and a work support, the combination of a variable feed transmission connected for effecting relative movement between the supports, automatic control means for said transmission for varying the rate thereof including a rate control plunger, a plurality of trip dogs prepositionable on the table for actuation of said plunger for varying the rate of relative movement between the supports in one direction, additional trip dogs prepositionable on the table and effective on said plunger for varying the rate of movement at prescribed points during uni-directional relative movement in an opposite direction, each of said trip dogs being ineffective as respects the opposite direction of relative movement.

8. A machine tool having a work support, a tool support, a variable feed transmission for effecting relative movement between said supports including an adjustable rate control element therefor, said element having a plurality of different positions for deriving a plurality of different feed rates, said element having an additional position for stopping said feed transmission, a plurality of control dogs differently positionable on the moving support for automatically and differently shifting said element during continuous movement of the moving support to effect different feed rates whereby different operating cycles may be obtained with the same control dogs, and an additional control dog prepositionable upon the moving support and effective on said control element for stopping said relative movement.

9. In a machine tool having a work support and a tool support, the combination of variable power transmission means for effecting relative movement between the supports at different feed rates, including a common control element for varying the feed rate, and for stopping and starting the transmission; means trip operable by the moving support for automatically changing one feed rate to any other feed rate and for stopping the feed movement; and manually operable means for positioning said control element to start the feed transmission.

10. A machine tool having a work support, a tool support, a variable feed transmission for effecting relative movement between said supports, control means for varying the rate of said transmission, including a control element prepositionable to adjust said transmission to yield a given feed rate; a rapid traverse transmission; means to connect automatically the rapid traverse transmission for subsequent movement of the support at a rapid traverse rate, and means to automatically disconnect the rapid traverse transmission, and reconnect the feed transmission for support movement but at a different rate than said given feed rate.

11. In a machine tool having a work support and a tool support, the combination of transmission means for effecting relative movement therebetween including a reverser mechanism having a control member movable to two different power transmitting positions for yielding opposite directions of support movement, means normally operable to maintain said control member in one or the other of its power transmitting positions, a variable feed transmission for actuating said support through the reverser, manually operable rate control means for said transmission, and means restraining operation of said manually operable means while the reverser is in either one of its power transmitting positions.

12. In a machine tool having a work support and a tool support, the combination of transmission means for effecting relative movement therebetween including a reverser mechanism having a control member movable to two different power transmitting positions for yielding opposite directions of support movement, means normally operable to maintain said control member in one or the other of its power transmitting positions, a variable feed transmisson for actuating said support through the reverser, manually operable rate control means for said transmission, means restraining operation of said manually operable means while the reverser is in either one of its power transmitting positions, and means to move the reverser to a stop position and simultaneously render said restraining means ineffective whereby said manually operable means may be utilized to adjust said rate control means.

13. A milling machine having a work support, a tool support, a variable feed transmission for effecting relative movement between the supports and including a rate control member coupled for increasing the rate of said transmission upon movement in one direction, and for decreasing the rate of the transmission upon movement in the opposite direction, a first trip dog carried by the movable support, motion transmitting means operable by the dog for moving said control element in one direction; a second trip dog, and motion transmitting means operable thereby for moving said control element in an opposite direction.

14. A milling machine having a column, a tool spindle journaled in the column, a work table supported by the column for movement transversely to the axis of said spindle, a feed transmission and a rapid traverse transmission for effecting said movement, a feed-rapid traverse selector clutch, a control member coupled for varying the rate of the feed transmission and means operable by said control member for shifting said selector clutch.

15. In a machine tool having a tool spindle, and a work support movable relative thereto, the combination with a feed transmission and a rapid traverse transmission for effecting said movement, of a common control member, means operable by said member to start and stop said feed transmission and to vary the feed rate thereof, and additional means controlled by said member to selectively connect the rapid traverse transmission for actuation of the moving part.

16. A machine tool having a work support, a tool spindle, means for effecting relative movement between the parts including a feed transmission, a rapid traverse transmission, control means therefor including a rotatable shaft having a first position for stopping said feed transmission, a second position for starting the feed transmission, a plurality of successive positions for increasing the rate of said feed transmission step-by-step, and a final position for disconnecting the feed transmission and connecting the rapid traverse transmission for actuation of the moving part.

17. In a machine tool having a work support and a tool support, the combination with a variable feed rate transmission for effecting said movement, of a rate variator movable in one direction to increase the feed rate and in a second direction to decrease the feed rate, and a pair of trip operable plungers adjacent the moving support and operatively coupled with said rate variator for respectively increasing and decreasing said rate automatically.

18. In a machine tool having a cutter spindle, and a work table movable relative thereto, the combination with a variable feed transmission for effecting table movement, of a rate variator movable in opposite directions to increase and decrease respectively the rate of said transmission, a pair of trip operable plungers adjacent the table and operatively connected for effecting the respective movements of the variator, and prepositionable means for limiting the movement imparted to the variator by the respective plungers.

19. In a machine tool having a cutter spindle and a work support, the combination with a variable feed transmission for effecting relative movement between the work support and tool spindle at different feeding rates, of a rate variator coupled for control of said transmission including an operating shaft movable in one direction to increase the rate, and in the other direction to decrease the rate, a pair of trip operable plungers adjacent the table for dog actuation thereby, uni-directional clutch means connecting the plungers to said shaft, means operable by one of said clutch means to effect rotation of the shaft in one direction, means operable by the other clutch means to effect rotation of the shaft in the opposite direction, and means to return the respective plungers after each actuation of its respective clutch means.

20. In a machine tool having a work support and a tool support the combination with a variable feed transmission for effecting relative movement between said supports, of a feed rate changer operatively connected with said transmission for varying the output rate thereof, said variator including a control member movable in one direction to increase the output rate, and in an opposite direction to decrease the output rate, a first uni-directionally operable mechanism for moving the member in one direction, a second uni-directionally operable mechanism for moving the member in an opposite direction, said mechanisms terminating in trip operable devices adjacent the movable support, and individual trip dogs carried by the moving support for operating said trip operable devices.

21. In a machine tool having a work support and a tool support the combination with a variable feed transmission for effecting relative movement between said supports, of a feed rate changer operatively connected with said transmission for varying the output rate thereof, said variator including a control member movable in one direction to increase the output rate, and in an opposite direction to decrease the output rate, a first uni-directionally operable mechanism for moving the member in one direction, a second uni-directionally operable mechanism for moving the member in an opposite direction, said mechanisms terminating in trip operable devices adjacent the movable support, individual trip dogs carried by the moving support for operating said trip operable devices, and prepositionable means associated with the respective trip dogs for limiting the movement imparted to each mechanism.

22. A machine tool having a support, a tool spindle journaled in the support, a work table carried by the support for movement transversely of the spindle, a variable feed transmission for effecting said movement, control means operatively coupled for varying the rate of said transmission including a control plunger mounted on the support in adjacent relation to the table, said plunger being rotatable to a first position for controlling the rate of table movement in one direction, and to a second position for controlling the rate of table movement in an opposite direction, said plunger being axially movable in either position to increase or decrease the feed rate, a first lug on the plunger for limiting its axial movement in either direction, when in one rotative position, and a second lug thereon for limiting its movement when in its other rotative position.

23. In a machine tool having a cutter, a work support and a variable feed transmission for effecting relative movement between the work support and cutter, the combination of control means for varying the rate of said transmission including a rate control plunger axially movable in opposite directions to increase or decrease the rate, and a tripping device prepositionable on the table having a first part for effecting movement of the plunger, and a second part for limiting the movement of the plunger to any desired extent whereby a subsequent rate may be determined automatically.

24. In a machine tool having a cutter spindle and a work support the combination with transmission means for effecting relative movement between the work support and cutter spindle selectively at feeding or rapid traverse rates, of control means for said transmission including a movable control member, means operable thereby when in one extreme position to stop said relative movement, means operable thereby when in its other extreme position to effect rapid traverse movement of the work table, and means operable thereby when in intermediate positions to vary the feeding rate of said work table.

25. In a machine tool having a cutter spindle and a work support the combination with transmission means for effecting relative movement between the work support and cutter spindle selectively at feeding or rapid traverse rates, of control means for said transmission including a movable control member, means operable thereby when in one extreme position to stop said relative movement, means operable thereby when in its other extreme position to effect rapid traverse movement of the work table, means operable thereby when in intermediate positions to vary the feeding rate of said work table, a first trip plunger, means operatively connected thereto to effect movement of the control plunger toward one extreme position, a second trip plunger, means connected thereto for effecting movement of the control plunger towards the other extreme position, and trip dogs prepositionable upon the table for operating each of said plungers.

26. A milling machine having a column, a cutter spindle journaled in the column, means carried by the column for supporting a work piece for relative movement with respect to said spindle, and means for variably rotating said spindle including a direct current electric motor, an alternating current source, a rectifying circuit coupling the motor to said source, electrical resistance means in said circuit for varying the speed of the motor and thereby of the spindle and manual operable means located at a control station of the machine for adjusting said resistance.

27. A machine tool having a work support, a tool support, a feed transmission for effecting relative movement between the supports including a member adjustable for obtaining a plurality of feed rates and cooperating members, one of which is carried by the moving support and the other operatively connected to said adjustable member whereby during travel of the movable support one of said cooperating members will shift the other to change the feed rate, and additional transmission means for effecting relative movement between the supports at a rapid traverse rate, and means to selectively connect said additional transmission for effecting said relative movement at a fast rate.

28. In a milling machine having a tool spindle support, and a work support, the combination of transmission means for effecting relative movement between the supports at a feeding rate, said transmission being variable to yield a first feeding rate, a second feeding rate, and a plurality of other feeding rates, trip dogs adapted to be selectively positioned on the moving support in different spaced relation to obtain different operating cycles, and a rate change mechanism including a part movable to effect a change from any of said rates to any other thereof, said mechanism also including portions adjacent the moving support for intermittent engagement by said trip dogs for automatically shifting said part from any one of its rate positions to any other thereof in accordance with the cyclic positioning of said trip dogs.

29. In a milling machine having a tool spindle support and a work support, the combination of a variable feed transmission means for effecting relative movement between the supports at a feeding rate, said transmission being variable to yield a first feeding rate, a second feeding rate and a plurality of other feeding rates, trip dogs adapted to be selectively positioned on the moving support in different spaced relation to obtain different operating cycles, a rate change mechanism including a part movable to effect a change from any of said rates to any other thereof, said mechanism also including portions adjacent said support for intermittent engagement by said trip dogs for automatically shifting said part from any of its rate positions to any other thereof in accordance with the cycle positioning of said trip dogs, and means for maintaining said part in any of its rate positions after the trip dogs have passed out of contact with said portions.

30. A milling machine having a work support, a cutter support, and a power feed transmission for effecting relative movement between the supports comprising a final train coupled to the movable support, a direct current prime mover for actuating the train, means to supply energy to the prime mover from an alternating current source including a rectifying circuit having variable electrical resistance means therein for varying the speed of a prime mover and thereby the rate of the moving support, and means to automatically change said speed from the movement of said support including a control member movable to vary said electrical resistance means, a plurality of trip dogs adapted to be variably spaced on said support to determine the points in support travel where changes in rate are to be effected, and means momentarily engageable by said trip dogs during their travel with the support to shift said control member variable amounts in accordance with the required amount of variation in rate.

31. In a machine tool having a tool support and a work support, the combination with a variable speed power transmission for effecting variable rates of feeding movement between said supports, of a movable rate variator for said transmission, means to normally frictionally stabilize the position of said variator in any given rate position thereof, a trip control mechanism including a pair of plungers located in different planes parallel to the direction of table movement operatively connected to said rate variator for moving the same respectively in opposite directions, and different trip dogs selectively positionable upon the table for engaging said plungers to cause selective adjustment of said control member in either direction, whereby the rate of the moving support may be automatically increased or decreased.

32. In a machine tool having a movable support, a variable feed power transmission for moving said support, and a rate control member operatively coupled with said transmission and movable in opposite directions to increase or decrease the output rate of said transmission, the combination of means for automatically shifting said control member at various instantaneous positions of said support during continuous travel thereof, including a plurality of trip dogs prepositionable on the table at prescribed points, a pair of trip plungers operatively connected to said control member and adapted to be selectively engaged by said trip dogs, one of said plungers operating to increase the rate of movement of said support and the other to decrease the rate of movement of said support, and adjustable means associated with each dog for predetermining the amount of movement to be imparted thereby to the rate control member.

33. A machine tool having a work support, a tool support, a variable feed transmission for effecting relative movement between said supports including an adjustable rate control element, said element having a plurality of different positions for deriving from said transmission a plurality of different feed rates, said element having an additional position for stopping said feed transmission, a plurality of control dogs prepositionable in variable spaced relation on the moving support for automatically shifting said element different amounts in opposite directions during continuous movement of the support to effect different increases or decreases in the feed rate, and an additional control dog prepositionable upon the moving support and effective on said control element for stopping said relative movement.

LEIGH W. WRIGHT.